United States Patent
Etoh et al.

[11] Patent Number: 6,130,003
[45] Date of Patent: Oct. 10, 2000

[54] BATTERY ASSEMBLY

[75] Inventors: Toyohiko Etoh, Toyota; Koh Watanabe, Toyohashi, both of Japan

[73] Assignee: Toyota Jidosha Kabushiki Kaisha, Toyota, Japan

[21] Appl. No.: 09/171,963

[22] PCT Filed: Mar. 11, 1998

[86] PCT No.: PCT/JP98/01024

§ 371 Date: Nov. 16, 1998

§ 102(e) Date: Nov. 16, 1998

[87] PCT Pub. No.: WO98/40918

PCT Pub. Date: Sep. 17, 1998

[30]  Foreign Application Priority Data

Mar. 11, 1997  [JP]  Japan .................................. 9-056481

[51] Int. Cl.⁷ .................................................. H01M 2/10
[52] U.S. Cl. .......................... 429/99; 429/100; 429/157; 429/159
[58] Field of Search .................... 429/157, 159, 429/120, 99, 100

[56]  References Cited

U.S. PATENT DOCUMENTS

| | | | |
|---|---|---|---|
| 4,443,523 | 4/1984 | Hasenauer | ................................. 429/99 |
| 5,034,290 | 7/1991 | Sands et al. | ........................ 429/159 X |
| 5,187,031 | 2/1993 | Heiman et al. | . |
| 5,578,392 | 11/1996 | Kawamura | . |
| 5,756,227 | 5/1998 | Suzuki et al. | . |
| 5,866,276 | 2/1999 | Ogami et al. | . |
| 5,879,833 | 3/1999 | Yoshii et al. | ........................ 429/157 X |

*Primary Examiner*—John S. Maples
*Attorney, Agent, or Firm*—Oliff & Berridge, PLC

[57]  ABSTRACT

A battery assembly which has a number of battery modules (16). For manufacturing, a battery module (16) is built in a battery case (10) having a fixed bulkhead (14) and a middle bulkhead (20) such that the module (16) penetrates the bulkheads (14) (20) via a battery holding opening (18) and a battery passing opening (22). The battery module (16) consists of batteries (12), with the connection parts of the batteries (12) held and supported by the battery holding openings (18) of the fixed bulkhead (14). A cooling/warming medium which flows upward is blocked or the cross sectional area of the cooling/warming medium flow is adjusted by a turning projection (38) so that the batteries (12) are effectively cooled or warmed irrespective of their vertical positions. A separately formed middle bulkhead (20) can facilitate manufacturing and assembling of the assembly. Batteries (12) can be more effectively cooled or warmed by using a smaller number of parts at a smaller number of assembling steps. The battery assembly is adaptable for being mounted on an electric motor vehicle, such as an electric motorcar.

4 Claims, 4 Drawing Sheets

| BATTERY HOLDING OPENING SIDE | BATTERY MODULE SIDE | ROTATE BY 60° AFTER INSERTION |
|:---:|:---:|:---:|
| (a) | (b) | (c) |

BATTERY ASSEMBLY

BACKGROUND OF THE INVENTION

1. Technical Field

The present invention relates to a battery assembly adapted to be mounted on an electric motor vehicle such as an electric car.

2. Background Art

For batteries, such as NiMH batteries, which are adaptable for use in an electric motor vehicle, it is known from theory and experience that the life of such a battery can be prolonged, and that such a battery can be more efficiently charged or discharged, when its temperature is kept within a predetermined range. Temperature control in a battery involves cooling or warming, and a corresponding battery storage or loading structure adaptable for cooling or warming a battery is therefore necessary. For example, Japanese Patent laid-open Publication No. Hei 5-343105 discloses a battery module which accommodates a number of rectangular parallelepiped battery cells. When using battery cells of such a shape, it is necessary to either to arrange the cells in contact with one another, or to set a fully rigid rectangular parallelepiped spacer intervening between battery cells in order to prevent cell deformation due to an increased inner pressure. In the above publication, a rectangular parallelepiped spacer having an opening is arranged between battery cells so that cooling medium or cool and flows through the opening.

However, since numerous spacers must be arranged in the above structure, the structure suffers from problems of complexity, increased part costs, and increased assembling steps. Moreover, such a structure is not directly applicable to a battery or a battery cell which is not rectangular parallelepiped.

DISCLOSURE OF INVENTION

One of the objects of the present invention is to provide a modified battery, a new structure for connecting parts between batteries, and a supporting structure for batteries and cells so that they can be efficiently cooled or warmed without requiring additional members such as spacers or the like. This will simplify structure and reduced part costs and assembling steps.

In order to achieve the above object, a battery assembly according to the present invention comprises a number of supporting bulkheads having battery holding openings formed therein at predetermined positions in a predetermined arrangement, and a number of battery modules each of which is a long cylindrical unit composed of a plurality of cylindrical battery cells electrically and mechanically connected in a longitudinal arrangement. The supporting bulkheads are arranged like the teeth of a comb, with a space equivalent to natural number of the length of one battery is ensured between adjacent supporting bulkheads. The battery module penetrates the arranged supporting bulkheads from one end to the other, and is inserted through the battery holding openings. Further, the supporting bulkhead holds and supports a connection part between batteries. With this arrangement, in the present invention, space is produced between supporting bulkheads. By supplying a thermal medium, such as air, through this space, batteries can be effectively cooled or warmed and there is no need to use an additional member such as an opened spacer or the equivalent. As a result, the structure is simplified, and part costs and assembly steps can be reduced. Furthermore, the connecting portions of batteries are unlikely to be damaged by mechanical vibration, even if they have poor mechanical rigidity or vibration resistance because that part is held by the supporting bulkhead. In other words, in the present invention, batteries can be connected using an inexpensive method free from problems regarding mechanical rigidity or vibration resistance.

It may also be preferable to employ a tuning bulkhead which has battery passing openings formed at predetermined positions in a predetermined arrangement and a tuning projection formed on the edge of the battery passing opening or a part between the openings, projecting in the direction where the batteries pass. The tuning bulkhead may be arranged between supporting bulkheads or between a supporting bulkhead and other tuning bulkhead. That is, the battery modules are set passing through not only the battery holding opening formed on the supporting bulkhead, but also through the battery passing opening formed on the tuning bulkhead. The tuning projection mentioned here is a projection formed for adjusting the flow of a medium inside the battery assembly. The projection adjusts the medium, for example, such that it flows at a higher speed in the downstream than in the upstream and further achieves a function for blocking heat exchange between the medium and a battery arranged upstream of the medium flow (hereinafter referred to as tuning). With this arrangement, a battery can be cooled or warmed irrespective of the flowing direction of the medium or positional relationship between the battery and the medium flow. Also, as compared to cases where a single bulkhead is responsible for the functions realized by a supporting bulkhead and a tuning bulkhead, each bulkhead can have a simpler structure because each has a simpler function because of the functional separation such that a supporting bulkhead is responsible for supporting, while a tuning bulkhead is responsible for tuning. Also, a supporting bulkhead must be formed accurately in the size or the position of a battery holding opening in order to achieve a holding function, a tuning bulkhead is free from such restriction. Therefore, functional separation between a supporting bulkhead and a tuning bulkhead can facilitate manufacturing and assembling. For example, by using a method in which a rib-shaped supporting bulkhead is formed in advance or a separate wall and a separately formed tuning bulkhead is later built, an inexpensive assembly can be provided through molding or an other method, despite the employment of a tuning bulkhead with a relatively complex shape including tuning projections.

Still further, the connection part between batteries may be provided with an electrically insulating elastic member which abuts on the inner surface of the battery holding opening with predetermined elasticity. The elastic member electrically insulates battery parts having different electrical potentials. With this arrangement, it is possible to achieve an electric insulating function for electrically insulating parts having different electric potentials of batteries and a function for preventing a damage caused to the connection part between batteries by dumping vibration applied thereto using a single member. As a result, the number of parts is reduced and an inexpensive battery assemble is achieved.

It is understood that, although the present invention is represented as "a battery assembly", it can also be represented as "a method for assembling a battery assembly", "a bulkhead for a battery assembly", "structure of a battery module using a cylindrical battery", "electric motor vehicle having a battery assembly", or the like. The variation of such an expression can be easily achieved by a person skilled in the art referring to the disclosure of the present application.

It should also be noted that the preferred embodiment to be described in the following as a specific example of the present invention is only one preferred embodiment of the present invention. In other words, the present invention may include various modifications without changing the concept thereof.

BEST MODE FOR CARRYING OUT THE INVENTION

Figure 1:
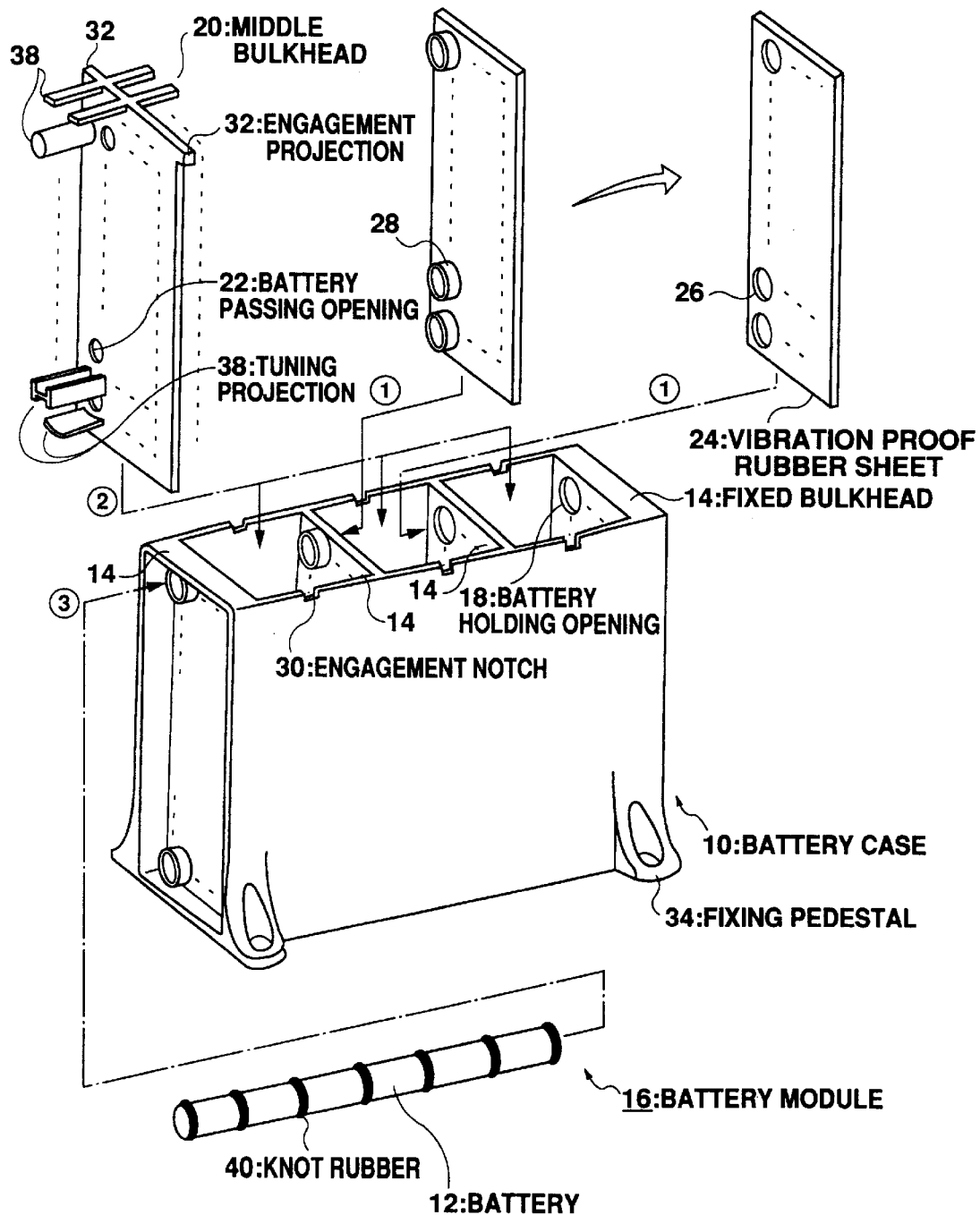
FIG. 1 is a perspective exploded view showing a structure of a battery assembly according to a preferred embodiment of the present invention.

Referring to FIG. 1, which shows a structure of and a method for assembling a battery assembly according to a preferred embodiment of the present invention, a battery case 10 of a substantially rectangular parallelepiped shape accommodates four (generally two or more) fixed bulkheads 14. The bulkheads 14 are arranged apart from adjacent bulkheads 14 having an interval space twice as long as the length of a battery 12 (generally a natural number of times). Each bulkhead 14 serving as a supporting bulkhead has openings each for holding and supporting a battery module 16 passing therethrough. In order to hold passing batteries 12, each battery holding opening 18 has a wall slightly protruding in the direction in which the battery module 16 passes therethrough. Separately to the battery case 10 and the fixed bulkheads 14 integrally formed by molding, three (generally natural number) middle bulkheads 20 are prepared by molding or the like. Each middle bulkhead 20, serving as a tuning bulkhead, has openings, or a battery passing openings 22, through which respective battery modules 16 pass. Each of the battery passing opening 22 may not have a wall such as that the battery holding opening 18 does, as it need not hold a battery 12.

For assembling, a vibration proof rubber sheet 24 is attached to each fixed bulkhead 14. The vibration proof rubber sheet 24 has openings 26 each at a position corresponding to each battery holding opening 18. Further, cylindrical projections 28 made of a vibration proof rubber are formed around the edge of the corresponding opening 26. For attachment, a vibration proof rubber sheet 24 is positioned with respect to the corresponding fixed bulkhead 14 such that the cylindrical projections 28 are inserted into the corresponding battery holding openings 18. After thus attaching the sheets 24 and the fixed bulkheads 14, middle bulkheads 20 are built in the battery case 10. Specifically, each of the middle bulkheads 20 is built in the battery case 10 substantially in the vicinity of the connection part of batteries 12 by, for example, engaging an engagement projection 32 formed at the upper part of the middle bulkhead 20 with an engagement notch 30 formed on the upper part of the battery case 10 at the middle between the adjacent fixed bulkheads 14. Then, a long column-like battery module 16 consisting of six (generally two or more) cylindrical batteries 12 electrically and mechanically connected, is inserted into the battery holding openings 18 and the battery passing openings 22, penetrating the fixed bulkheads 14 and the middle bulkheads 20. In actuality, many battery modules 16 are used, though not shown in FIG. 1. After all battery modules 16 are built in the battery case 10, the resultant battery assembly shown in FIG. 1 is adaptable for being fixed below the floor or to a luggage of an electric motor vehicle by using a fixing pedestal 34 or the like formed at the lower part of the battery case 10. Note that members not significant to the operation of the present invention have been omitted from FIG. 1.

Figure 6:
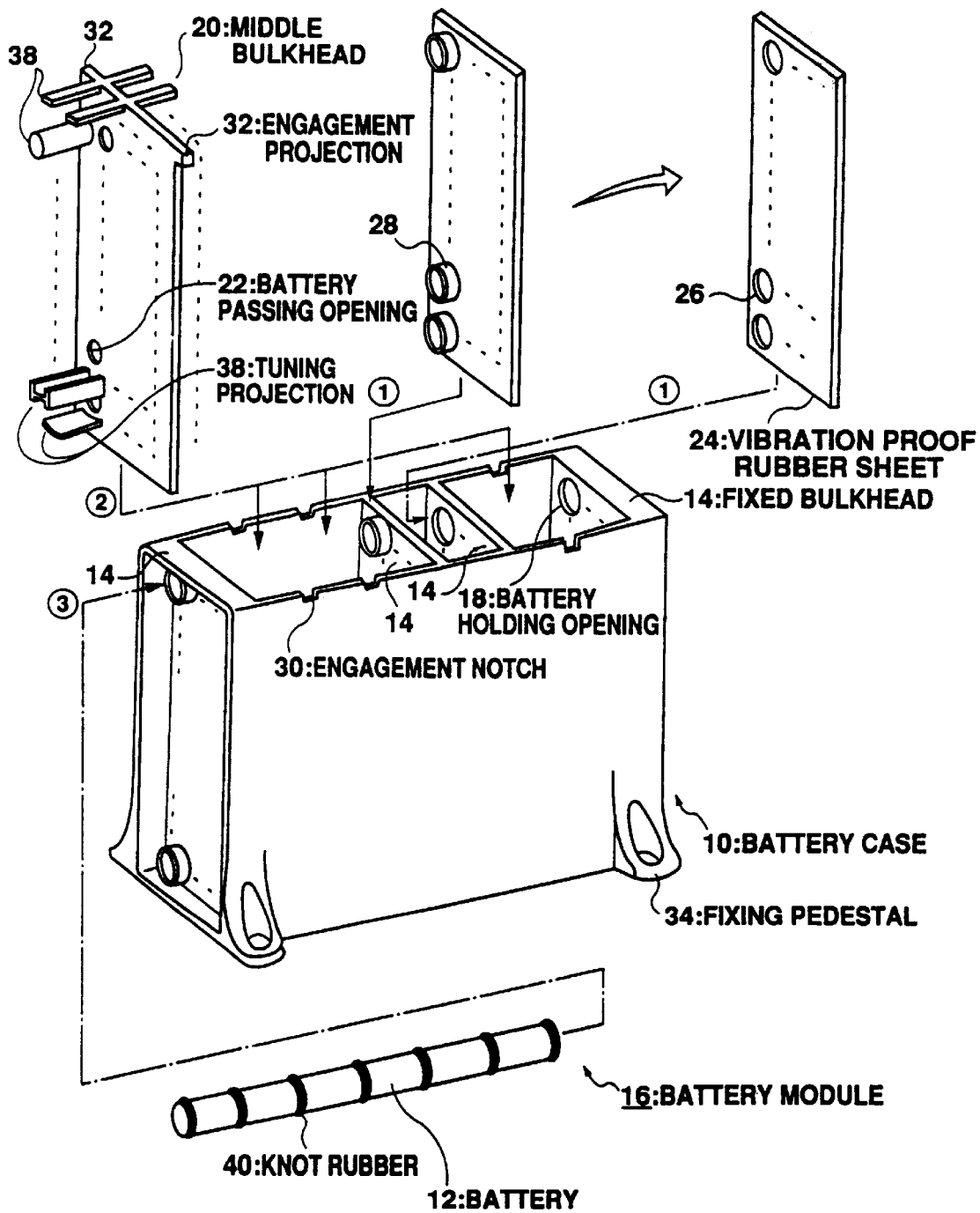
FIG. 6 is a perspective exploded view showing a structure of a battery assembly according to an embodiment of the present invention.

FIG. 6 shows an embodiment where tuning or middle bulkheads 20 can be adjacent to each other.

Figure 2:
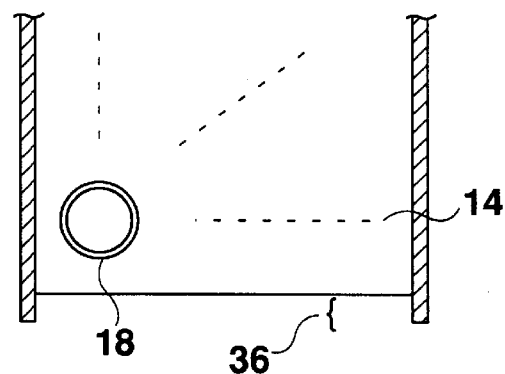
FIG. 2 is a partial cross sectional view in the longitudinal direction, showing an example of a bulkhead shape according to the preferred embodiment of the present invention.

As described above, since a battery module 16, which is a long connection of cylindrical batteries 12, is accommodated in the battery case 10 where fixed bulkheads 14 and middle bulkheads 20 are integrally formed or built in, a space is produced between adjacent fixed bulkhead 14 and middle bulkhead 20 so that a cooling/warming medium, such as air, can be supplied through the space to the batteries 12 between the fixed bulkhead 14 and the middle bulkhead 20. Therefore, this arrangement needs only a small number of members, which enables reduction of part costs and assembling steps. Further, as shown in FIG. 2, a space 36 can be ensured in the lower part of the fixed bulkheads 14. With this arrangement, a flowing path for the medium is ensured in the lower part of the battery case 10, which enables more efficient cooling and warming of the batteries. It is to be noted that although the lower part of the fixed bulkhead 14 is shown as an example in FIG. 2, the upper part thereof and the upper and lower parts of a middle bulkhead 20 can be constructed similarly.

According to this embodiment, tuning projections 38 of various shapes are formed on middle bulkheads 20. The tuning projections 38 are provided to achieve efficient heat exchanges (tuning) between batteries and the medium by blocking the heat exchange with respect to a battery arranged upstream the medium flow or by reducing the cross sectional area of the medium flow path (i.e., increasing a flow velocity) with respect to a battery arranged downstream the medium flow. Therefore, with a medium flowing from the lower to upper part of the battery case 10, as shown in FIG. 1, a tuning projection 38 may be formed in the form of, for example, a wall covering the lower part of a battery passing opening 22 formed on the lower part of a middle bulkhead 20 or a pillar standing between battery passing openings 22 on the upper part of a middle bulkhead 20. Note that various other forms and formation positions may be adaptable for a tuning projection 38, though not described here for the brevity of description. Provision of such a tuning projection enables further efficient cooling and warming of batteries in this embodiment.

Further, according to this embodiment, the fixed bulkhead 14 is responsible for holding the battery modules 16, while the middle bulkhead 20 is responsible for tuning. Functional separation and separate formation of middle bulkheads 20 from the battery case 10 will facilitate manufacturing of parts. In other words, middle bulkheads 20 of a relatively complicated shape with tuning projections 38 are made separately from the other part of the assembly, so that the parts of the assembly can be easily manufactured using molding or other simple methods. In addition, as compared to a structure with all bulkheads formed as fixed bulkheads 14, a battery module 16 can be more easily inserted in the assembly because of a small insertion resistance. Note that although fixed bulkheads 14 and middle bulkheads 20 are alternately arranged each corresponding to the connection part of the batteries 12 of the battery module 16 in FIG. 1, the present invention is not limited to a regular alternating arrangement or to an arrangement at a connection part.

Also, because the vibration proof rubber sheet 24 is attached to the fixed bulkhead 14 so as to hold and support the connection part of the batteries 12 by the battery holding opening 18, the connection part is unlikely to be displaced and damaged by mechanical vibration. Also although vibration proof rubber sheets 24 which would be attached to the fixed bulkheads 14 at the ends of the battery module 16 are omitted in FIG. 1, they may instead be provided. Further, the vibration proof rubber sheets 24 may be eliminated by using knob rubbers 40 which are originally used to electrically insulate the parts of different potentials between adjacent batteries 12 of a battery module 16.

Figure 3:
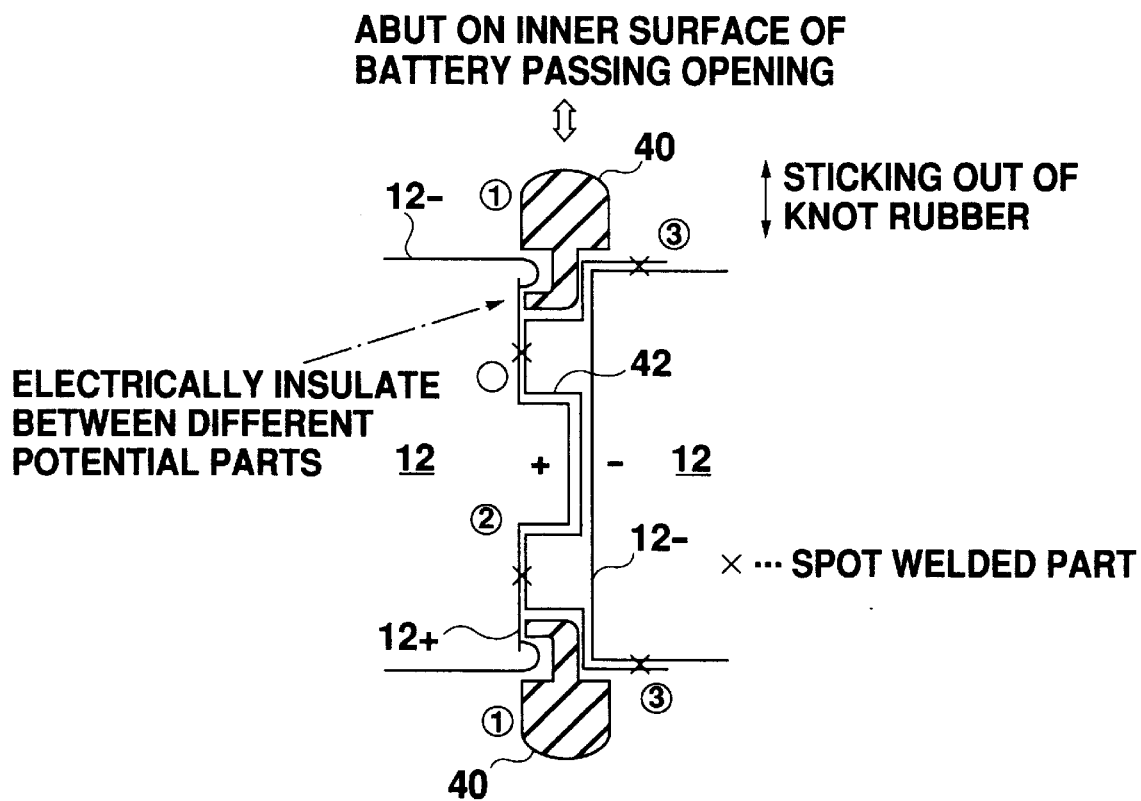
FIG. 3 is a schematic cross sectional view showing a modified structure of a connection part between batteries according to the preferred embodiment of the present invention.

For example, the connection part of batteries 12 may be designed to have a structure as shown in FIG. 3. Note that every member shown in FIG. 3 has a thickness, though not shown for brevity of description. Also, the positive electrode of a battery 12 and a part having an equivalent polarity thereto are represented by a reference 12+, while the negative electrode and a part having an equivalent polarity thereto are represented by a reference 12− and the positive electrode member 12+ and the negative electrode member 12− of the same battery 12 are electrically insulated by an insulating member (not shown). To electrically and mechanically connect two batteries 12, a knot rubber 40 is arranged covering the right end of the negative electrode member 12− of the battery 12 shown on the left side in the drawing. Then, a connection member 42 is arranged covering the positive electrode member 12+ of the left side battery and spot-welded. The arrangement of a knot rubber 40 and the spot-welding of a connection member 42 may also be made in a reversed order. The mark x in the drawing represents a spot-welding point. Further, the battery 12 on the right side is inserted into the connection member 42, and the connecting member 42 is spot-welded to the negative electrode member 12− of the right side battery. In this structure, the knot rubber 40 serves to electrically insulate the negative electrode member 12− of the left side battery 12 and that of the right side battery 12, i.e., the members having electric potential difference corresponding to one battery 12. As described above, the vibration proof rubber sheet 24 can be eliminated when a large knot rubber 40 enough to stick out to outside the batteries is used. That is, by appropriately deciding the shape and size of a knot rubber 40 which is necessary for electrical insulation of the parts of different electrical potentials between adjacent batteries 12, functions of damping vibration and preventing displacement can be achieved using the knot rubber 40 in place of a vibration proof rubber sheet 24. This enables reduction of the number of parts and assembling steps while achieving the same function.

Figure 4:
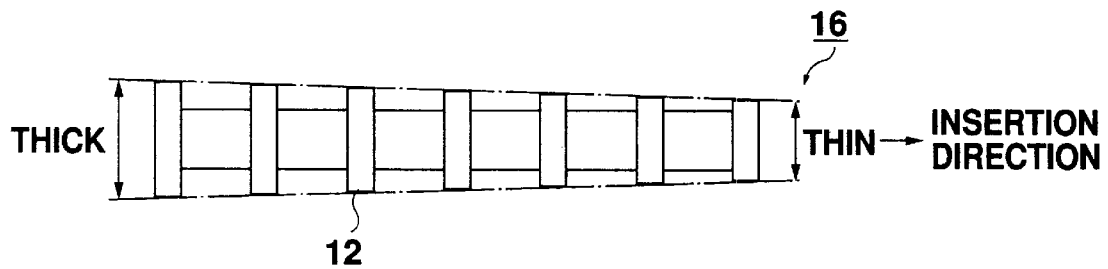
FIG. 4 is a side view showing an example to determine the size of a knot rubber according to the preferred embodiment of the present invention.
Figure 5:
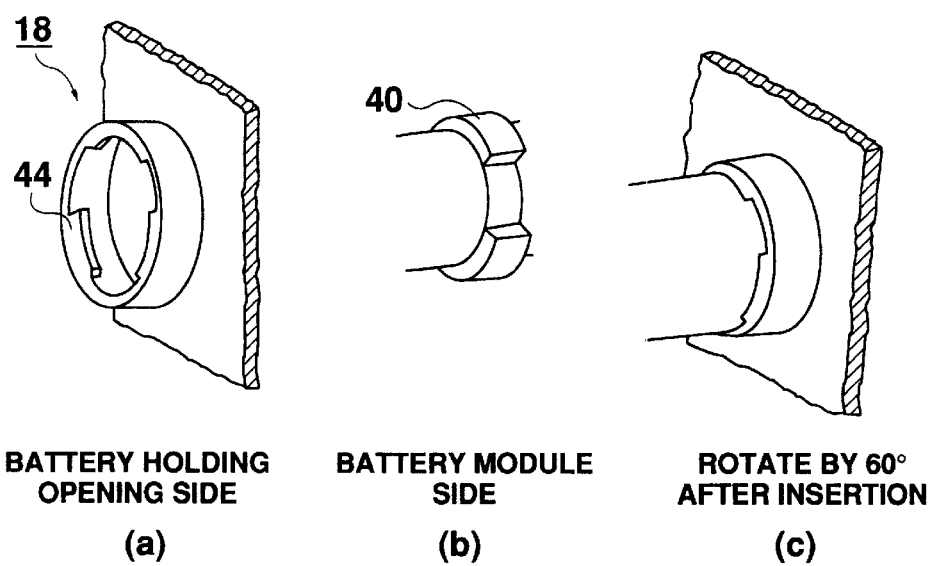
FIG. 5 shows perspective views of examples of the shape of a knot rubber according to the preferred embodiment of the present invention, particularly, (a) showing the shape of a projection formed on a battery holding opening, (b) showing the shape of a knot rubber attached to a battery module, and (c) showing a state in which the battery module passes through a battery holding opening and rotated by 60°.

Also, further selection of the shape and size of the knot rubber 40 can facilitate manufacturing. For example, knot rubbers 40 may be designed with a taper such that, as shown in FIG. 4, a knot rubber 40 having a smaller external diameter is attached closer to the leading end of the battery module 16 passing through the openings, while that having a larger external diameter is attached closer to the tailing end. With this arrangement, rattling in building the battery module 16 in the battery case 10, i.e., insertion resistance caused around the battery holding openings 16, and so on, can be reduced. In order to ensure rigid holding by the battery holding openings 18 when using the above shaped battery module 16, the battery holding openings 18 are preferably processed having similar difference in the inner diameter. Further, a battery holding opening 18 may be formed having an engagement projection 44 on the inner surface thereof 18 for every 60°, as shown in FIG. 5(a), and a knot rubber 40 may be formed having a notch for every 60° corresponding to the projection. In such a case, the battery module 16 is inserted into the battery holding opening 18 in a posture and angle such that the knot rubbers 40 do not interfere with the projections 44, and rotated by 60° when it is fully inserted, so that the knot rubbers 40 are engaged with the projections 44 whereby the battery module 16 is fixed. When inserting the battery module 16, the knot rubbers 40 do not cause insertion resistance.

As described above, according to the present invention, a number of supporting bulkheads and battery modules are used, with each battery module being arranged to pass through battery holding openings so that they penetrate supporting bulkheads arranged like the teeth of a comb, so that the connection parts of batteries are held by the supporting bulkheads. With this arrangement, a space can be ensured between supporting bulkheads through which a medium, such as air, can flow so that batteries can be efficiently cooled or warmed without requiring a spacer having openings or the equivalent. Further, since the connection parts of batteries are held by supporting bulkheads, mechanical vibration is unlikely to cause damage thereto. This enables employment of an inexpensive method for connecting batteries.

Still further, according to a preferred embodiment of the present invention, a tuning bulkhead is arranged between supporting bulkheads or between a supporting bulkheads and other tuning bulkheads so that the medium flow inside the battery assembly can be controlled using the tuning projection formed on the tuning bulkhead. With this arrangement, all batteries can be favorably cooled/warmed, irrespective of the direction of the medium flow or the direction relationship of the battery with respect to the medium flow. Still further, functional separation, such that a supporting bulkhead is responsible for supporting while a tuning bulkhead is responsible for tuning, achieves a simplified assembly structure, and facilitated manufacturing and assembling of the assembly. This allows further reduction of battery assembly cost.

Yet further, according to the preferred embodiment of the present invention, since an electrical insulating elastic member is provided to a connection part of batteries and abutting on the inner surface of a battery holding opening with predetermined elasticity to electrically insulate the parts having different electrical potentials of the batteries, an electrical insulating function for electrically insulating the parts having different electrical potentials of batteries and a vibration proof function for preventing damage on the connection parts of batteries by dumping the vibration applied thereto can be achieved using a single member. As a result, the number of parts can be reduced, which enables production of an inexpensive battery assembly.

INDUSTRIAL APPLICABILITY

The present invention is usable, not only in an electric motor vehicle such as an electric motorcar, but also in various other fields where a large number of battery cells are used.

What is claimed is:

1. A battery assembly, comprising:

a number of supporting bulkheads having battery holding openings formed thereon; and a number of battery modules each being a long cylindrical unit consisting of a number of cylindrical batteries electrically and mechanically connected in a longitudinal arrangement; wherein each of said number of the supporting bulkheads arranged roughly similar to the teeth of a comb and are separated from adjacent bulkheads by a space equivalent to a natural number times as long as a length of one cylindrical battery, and said number of the battery modules each penetrate an arrangement of said number of the supporting bulkheads from one end to the other while passing through the battery holding openings such that connection parts of a battery module where adjacent batteries are connected to each other are held and supported by the supporting bulkheads.

2. A battery assembly according to claim 1, further comprising a tuning bulkhead having battery passing openings formed thereon, and a tuning projection formed on an edge of a battery passing opening or a part between battery passing openings, projecting in a direction where a battery module passes, the tuning bulkhead being formed between adjacent supporting bulkheads or between a supporting bulkhead and another tuning bulkhead, wherein the battery modules pass through the battery passing openings.

3. A battery assembly according to claim 1, further comprising an electrically insulating elastic member formed on the connection part, abutting on an inner surface of a battery holding opening with predetermined elasticity and for electrically insulating parts having different electrical potentials of batteries connected each other at the connection to part.

4. A battery assembly according to claim 2, further comprising an electrically insulating elastic member formed on the connection part, abutting on an inner surface of a battery holding opening with predetermined elasticity and for electrically insulating parts having different electrical potentials of batteries connected to each other at the connection part.

* * * * *